United States Patent

[11] 3,554,420

[72] Inventor Jerome G. Agius
Ridgefield, Conn.

[21] Appl. No. 753,358
[22] Filed Aug. 19, 1968
[45] Patented Jan. 12, 1971
[73] Assignee Benrus Corporation
Ridgefield, Conn.
a corporation of Delaware

[54] TAPE TRANSPORT CAPSTAN WITH FILTER
20 Claims, 3 Drawing Figs.

[52] U.S. Cl. .......... 226/95, 226/190
[51] Int. Cl. .......... B65h 17/30
[50] Field of Search .......... 226/7, 95, 97, 190, 188

[56] References Cited

UNITED STATES PATENTS

| | | | |
|---|---|---|---|
| 3,172,321 | 3/1965 | Schrader .......... | 226/95X |
| 3,204,843 | 9/1965 | Pendleton .......... | 226/95 |
| 3,270,933 | 9/1966 | Dekker .......... | 226/97 |

*Primary Examiner*—Richard A. Schacher
*Attorney*—James and Franklin

ABSTRACT: A tape transport capstan comprises an outer annular wall defining a tape-engaging surface and an annular chamber formed in the body. That chamber is filled with a filter material having a plurality of fluid-flow-restricting passages communicating with a fluid passage provided in the body and with relatively large apertures formed through the outer wall. An easily removable chamber cover permits the ready insertion or removal of the filter material from the chamber.

PATENTED JAN 12 1971 3,554,420

INVENTOR
JEROME G. AGIUS
BY James H. Franklin
ATTORNEY

TAPE TRANSPORT CAPSTAN WITH FILTER

The present invention relates to tape transporting capstans, and particularly to capstans having provisions for applying a fluid at the tape engaging surface to develop either a suction or an outward pressure on the tape.

Tape transporting capstans are commonly used in computers for the purpose of transporting a length of magnetic tape past a recording (readin) or reproducing (readout) head. When readin or readout operations are to be performed the tape must be positioned with extreme accuracy. As a typical computer may utilize tapes of great length, it is imperative that the tape be transported at great speed to desired position, so that the computer may operate with as little time delay as possible. To enable operation of the capstan tape transport for high positional accuracy and high speed, it is known to provide a fluid system in combination with the capstan tape structure by means of which a suction force is applied to the tape engaging surface of the capstan when the tape is being transported in the forward direction. This suction force urges the tape into intimate engagement with the tape engaging surface of the capstan and thus the rotational position of the capstan controls with great accuracy the position of the tape. When the tape is being transported in the reverse direction for purposes of rewinding, the direction of the fluid flow is reversed so that an outward pressure is now applied to the tape to move it away from the capstan surface so that the tape now may be substantially free of frictional contact with the capstan, and is thus able to move at a much greater speed, the accuracy of tape positioning not being essential in the rewinding or reverse movement operation.

To develop the fluid engagement with the tape, a plurality of apertures are formed in the outer tape engaging wall of the capstan, those apertures communicating with an external fluid supply. When the apertures are of a relatively large diameter, there is the advantage that they are not readily clogged by dirt, grit and magnetic particles which may be abraded from or picked up by the tape. However, because of the large size of such apertures, a relatively large fluid pump must be provided in order to develop the required suction and pressure fluid forces on the tape. The need for large capacity fluid pumps increases the size, complexity and cost of the capstan tape drive system. Conversely, when the capstan is provided with apertures of relatively small diameter, they tend to become clogged by the aforementioned particles, thereby cutting off the flow of the fluid to the tape and negating the effectiveness of the fluid system as an aid in the transporting of the tape. When the small apertures become clogged it is necessary to remove the capstan from its driving system and then to remove the capstan from its driving system and then to remove the clogging particles from the apertures. This operation commonly requires the complete shutdown of the computer system for a considerable length of time, thus causing great inconvenience and increased expense of operation of the computer. In some instances, as when the capstan comprises a porous sintered metal body, the pores cannot be cleaned; instead the clogged outer portion of the capstan must be abraded away, a quite difficult operation in view of the hardness of the sintered material.

Thus, it would be highly desirable to provide an improved tape transporting capstan of the type described in which the advantages of large aperture operation, i.e. the reduction of clogging, can be achieved without the accompanying disadvantage of having to use a large capacity fluid pump.

It is the prime object of the present invention to provide a tape transport capstan in which the disadvantages of the known capstans of the type described are substantially overcome and in which a relatively low capacity fluid pump may be utilized with a capstan having relatively large apertures communicating with the tape.

It is a further object of the present invention to provide a tape transport capstan which, when it becomes clogged with dirt and similar particles, can be quickly and readily serviced to remove the clogging particles therefrom.

It is another object of the present invention to provide a tape transport capstan which, when it becomes clogged with dirt and similar particles, can be quickly and readily serviced to remove the clogging particles therefrom.

It is yet a further object of the present invention to provide a tape transport capstan in which removable filter material is inserted between the fluid supply and the tape engaging surface, the filter removing extraneous dirt particles and thereby protecting the operation of that system, said filter material being easily removable and replaceable so that the operation of the tape transporting capstan is substantially uninterrupted.

To these ends, the present invention provides a rotatable tape transport body having an annular outer wall defining a tape engaging surface, said body having an annular chamber formed therein spaced radially inwardly from said outer wall. A fluid-flow-restricting member in the form of a porous filter material is inserted into that chamber and communicates with a fluid conduit provided in body and with a plurality of relatively large size apertures formed through the outer wall. The filter material defines a plurality of relatively narrow fluid-flow-restricting passages and thus make s possible the use of a relatively low capacity fluid pump to develop the necessary pressures at the tape-engaging surface.

The filter receiving chamber is preferably open at one end and a cover part is removably placed over that open end. The removal of the cover part exposes the chamber and thus permits the ready removal and insertion of filter material.

The capstan may be rotated by means of shaft extending into an axial bore formed in the capstan body, said fluid conduit comprising a first part extending substantially axially through the shaft and a second part extending substantially through said body laterally from said bore and communicating between the first conduit part and the chamber.

To the accomplishment of the above, and to such other objects as may hereinafter appear, the present invention relates to the construction of a tape capstan as defined in the accompanying claim and as described in this specification, taken together with the accompanying drawing, in which:

Figure 1:
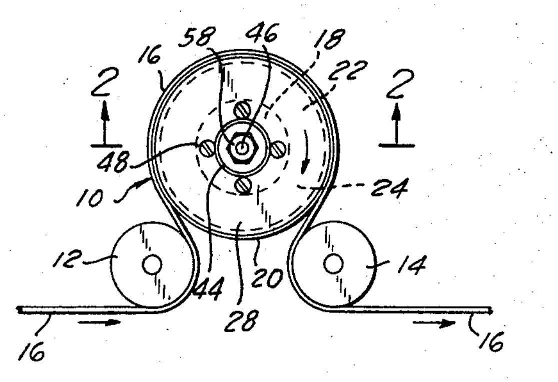
FIG. 1 is a plan view of an exemplary tape transport system in which the capstan of the present invention is utilized.

FIG. 1 illustrates a typical tape transport system used, for example, in computers or the like, in which a rotatably driven capstan, generally designated 10, and a pair of guide rollers 12 and 14 are employed, rollers 12 and 14 serving to guide an elongated strip of magnetic tape 16 about the external tape-engaging surface of capstan 10 in a known manner.

Broadly described, the capstan 10, constructed according to the present invention, comprises a rotatable central member generally designated 18 and comprising a central upstanding part 19 and a radially outwardly extending bottom wall part 21. A ring-shaped outer wall 20 is secured to bottom wall part 21 and extends up therefrom, an annular chamber 22 being formed radially between wall 20 and core 18. A fluid-flow-restricting member in the form of a mass of filter material 24 is placed within and preferably snugly fills chamber 22 and defines a large number of relatively narrow fluid flow passageways laterally through the chamber 22. A plurality of relatively large apertures 26 are formed in the outer wall 20, those apertures communicating between the chamber 22 and the outer tape-engaging surface of the wall 20. The apertures 26 are of a size such as to permit free fluid flow therethrough. They may, for example, have a diameter of approximately one-sixteenth inch.

Figure 2:
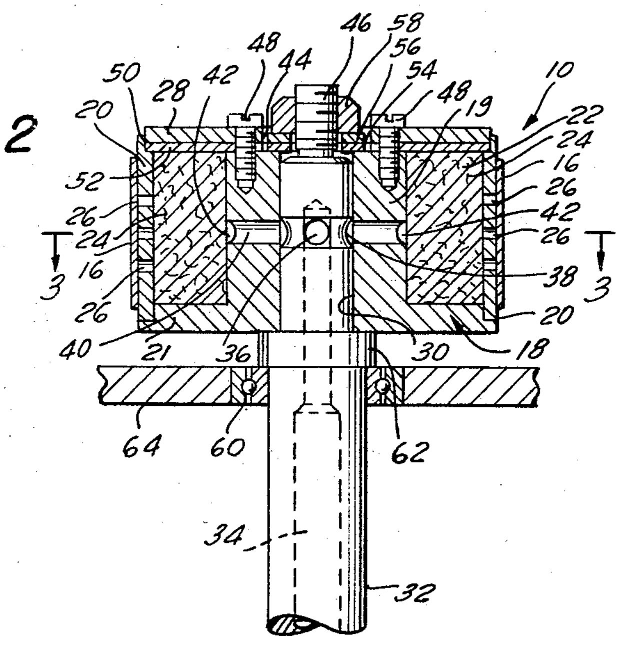
FIG. 2 is a vertical section on an enlarged scale taken along the line 2–2 of FIG. 1.

Chamber 22 is open at it axially upper end as viewed in FIG. 2 and a cover plate 28 is removably secured to capstan 10 and is positioned over that open chamber end. The removal of cover plate 28 from capstan 10 thus leaves exposed the chamber 22, thereby to permit the ready removal and/or insertion of filter material 24 relative to chamber 22 if and when desired or necessary, for reasons set forth below.

Figure 3:
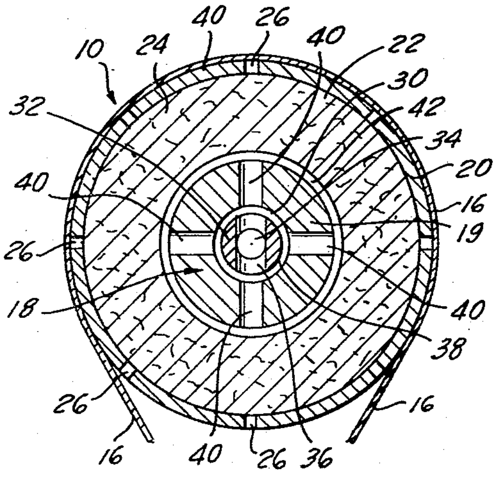
FIG. 3 is a transverse section taken along the line 3–3 of FIG. 2.

The central upstanding part 19 of core member 18 is provided with an axial bore or recess 20 which receives a rotatably driven shaft 32. An axial fluid passage 34 is formed in shaft 32 which communicates at its lower end with a remote fluid source or pump and at its upper end with a lateral fluid passage 36 (FIG. 3) which in turn communicates with a circumferential groove 38 formed about the periphery of shaft 32. Groove 38 in turn communicated with the inner ends of four radial, lateral passages 40 formed through the part 19 of member 18, passages 40 being arranged in quadrature and communicating at their outer ends with a circumferential groove 42 formed about the periphery of the part 19, groove 42 then communicating with the annular chamber 22.

Thus, the narrow fluid-flow-restricting passages of filter material 24 are connected via the fluid passageways 34, 36 and 38 in shaft 32 and passageways 40 and 42 in member 18, in series with the external fluid source and with the relatively large sized apertures 26 formed in the tape-engaging surface of wall 20; the passageways 34–42 are all of a size such as to permit ready fluid flow therethrough. The filter material 24, however, provides a restricted fluid flow path, thereby to permit the use of an external fluid pump, connected to passage 34, which is of a relatively low capacity. In the absence of the fluid-flow-restricting filter material 24 between these points, a fluid pump of substantially greater capacity would have been required to develop an equivalent suction force on the tape.

Dirt and grit particles, or magnetic particles which may be abraded from the surface of tape 16, may readily pass through the relatively large apertures 26 and are captured within the much narrower passages of filter material 24. Thus, these particles do not reach the fluid conduit formed in member 18 and shaft 32. When a sufficient amount of these particles accumulates in the filter material 24 so as to clog its narrower passageways, a new mass of filter material must be substituted for the one which has been clogged by the dirt and other particles. To effect this substitution, cover plate 28 is removed from the upper end of capstan 10, thus exposing chamber 22 and filter material 24 as described above, thereby to enable the desired replacement of the filter material in a quick and facile manner.

In a preferred construction of the capstan of this invention, cover plate 28 is provided with a circular central opening 44 which is placed over and about an upper, threaded extension 46 of shaft 32, plate 28 then being secured to part 19 by means of screws 48. The outer peripheral annular end of plate 28 sealingly engages the outer annular wall 20 along an annular shelf 50 formed near the upper end of all 20. A gasket 52 may be placed between cover plate 28 and the filter material 24 to improve the seal therebetween. A gasket 54, a washer 56, and a lock nut 58 are placed and secured about the threaded shaft extension 46, thereby to effectively and securely attach control member 18 and thus capstan 10 to shaft 32 so that capstan 10 rotates along with shaft 32. In this manner the mounting of capstan 10 on its rotating shaft is effected by means independent of the securing of cover plate 28 to the capstan, so that the removal and replacement of cover plate 28 to permit the removal and insertion of filter material into the chamber is readily accomplished without disturbing the connection between the capstan 1 and its shaft 32.

The filter material may be formed of a mass of paper, wool or felt, or may be formed of a sintered material, or of any other porous material which exhibits the fluid-flow-restricting narrow fluid passageways as described herein. The apertures 26 in the tape-engaging surfaces may be circular, as indicated above, or in the alternative, they may be in the form of circumferentially elongated slots having, for example, a vertical dimension of approximately .020 inch and a longitudinal dimension of approximately .450 inch.

The construction of the capstan drive mechanism also includes a bearing 60 in which shaft 32 is journaled, a collar 62 being arranged between the bottom wall of capstan 10 and a support member 64 which carries bearing 60.

Thus, the capstan of the present invention may be utilized with relatively large sized apertures in its tape-engaging surface, while developing a suitable fluid pressure at that surface from an external fluid pump of a relatively low capacity. The apertures on the tape-engaging surface are sufficiently large to permit dirt, grit and other foreign particles to pass therethrough, which particles are then trapped in the narrower passages of the filter material. The removal of the filter material from the capstan whenever necessary, as well as the insertion of a replacement filter, may be readily performed by the removal of a cover plate from the upper end of the capstan which is accessible. This operation, moreover, may be performed without the need for removing the capstan body from its driving shaft.

Thus, the capstan of the present invention may be reliably operated for long periods of time with sufficient tape attracting and repelling forces being developed at the tape-engaging surface from a relatively low capacity fluid source. The problem of the clogging of the apertures in that surface is substantially completely eliminated as a result of the size of these apertures.

While only a single embodiment of a capstan constructed in accord with this invention has been herein specifically disclosed, it will be understood that many variations may be made therein, all within the scope of this invention as defined in the following claims.

I claim:

1. A rotatable body having an outer wall defining a tape-engaging surface and having an annular chamber formed in said body radially inside said wall, means connected to said body and effective to rotate the latter, a member in said chamber having a plurality of relatively narrow fluid-flow restricting passages therethrough, said body having a fluid conduit therein communicating between said chamber and a point outside said body remote from said surface, said wall having a plurality of relatively large apertures therethrough communicating between said chamber and said surface, said apertures and said conduit defining free-fluid-flow passages and said member defining a restricted-fluid-flow passage, said passages being series connected between said surface and said point remote from said surface.

2. The rotatable body of claim 1, in which said member comprises a mass of filter material.

3. The rotatable body of claim 2, in which said body comprises a removable part defining a wall of said chamber, said part when removed exposing said chamber and permitting the removal of said member relative to said chamber.

4. The rotatable body of claim 3, in which said removable part is mounted on said body at a point spaced from said means for rotating said body.

5. The rotatable body of claim 3, in which said means for rotating said body comprises a shaft extending from one end of said body, said removable part being located at the end of said body opposite said one end.

6. The rotatable body of claim 3, in which said body has an axial recess therein, said rotating means extending through said recess, said removable part being mounted on said body independently of said rotating means and the securing means therefor, thereby to be removable from said body while said body remains secured to said rotating means.

7. The rotatable body of claim 6, said fluid conduit comprising a first part extending through said rotating means substantially axially and then substantially laterally to the outer surface of said rotating means, and a second part in communication with said first part and extending through said body substantially laterally from said recess to said chamber.

8. The rotatable body of claim 6, said fluid conduit comprising a first part extending through said rotating means substantially axially and then substantially laterally to the outer surface of said rotating means, and a second part in communication with said first part and extending through said body substantially laterally from said recess to said chamber, said first part ending at said outer surface of said rotating means in a circumferential groove.

9. The rotatable body of claim 6, said fluid conduit comprising a first part extending through said rotating means substantially axially and then substantially laterally to the outer surface of said rotating means, and a second part in communication with said first pa·t and extending through said body substantially laterally from said recess to said chamber, said second part ending at said chamber in a circumferential groove.

10. The rotatable body of claim 6, said fluid conduit comprising a first part extending through said rotating means substantially axially and then substantially laterally to the outer surface of said rotating means, and a second part in communication with said first part and extending through said body substantially laterally from said recess to said chamber, said first part ending at said outer surface of said rotating means in a circumferential groove, and said second part ending at said chamber in a circumferential groove.

11. The rotatable body of claim 1, in which said body comprises a removable part defining a wall of said chamber, said part when removed exposing said chamber and permitting the removal of said member relative to said chamber.

12. The rotatable body of claim 11, in which said removable part is mounted on said body as a point spaced from said means for rotating said body.

13. The rotatable body of claim 11, in which said means for rotating said body comprises a shaft extending from one end of said body, said removable part being located at the end of said body opposite said one end.

14. The rotatable body of claim 11, in which body has an axial recess therein, said rotating means extending through said recess, said removable part being mounted on said body independently of said rotating means and the securing means therefor, thereby to be removable from said body while said body remains secured to said rotating means.

15. The rotatable body of claim 14, said fluid conduit comprising a fluid part extending through said rotating means substantially axially and then substantially laterally to the outer surface of said rotating means, and a second part in communication with said first part and extending through said body substantially laterally from said recess to said chamber.

16. The rotatable body of claim 14, said fluid conduit comprising a first part extending through said rotating means substantially axially and then substantially laterally to the outer surface of said rotating means, and a second part in communication with said first part and extending through said body substantially laterally from said recess to said chamber, said first part ending at said outer surface of said rotating means in a circumferential groove.

17. The rotatable body of claim 14, said fluid conduit comprising a first part extending through said rotating means substantially axially and then substantially laterally to the outer surface of said rotating means, and a second part in communication with said first part and extending through said body substantially laterally from said recess to said chamber, said second part ending at said chamber in a circumferential groove.

18. The rotatable body of claim 14, said fluid conduit comprising a first part extending through said rotating means substantially axially and then substantially laterally to the outer surface of said rotating means, and a second part in communication with said first part and extending through said body substantially laterally from said recess to said chamber, said first part ending st said outer surface of said rotating means in a circumferential groove, and said second part ending at said chamber in a circumferential groove.

19. The rotatable body of claim 1, in which said body has an axial recess therein, said rotating means extending through said recess, said fluid conduit comprising a first part extending through said rotating means substantially laterally to the outer surface of said rotating means, and a second part in communication with said first part and extending through said body substantially laterally from said recess to said chamber.

20. The rotatable body of claim 19, in which said second conduit part ends at said chamber in a circumferential groove, and said first conduit part ends at said outer surface of said rotating means in a circumferential groove.